US006701115B2

(12) United States Patent
Miyasaka et al.

(10) Patent No.: US 6,701,115 B2
(45) **Date of Patent: *Mar. 2, 2004**

(54) COLOR ELECTROGRAPHIC APPARATUS WITH DEVELOPING DEVICE HAVING SEPARATED TONER SUPPLY AND RECOVERY CHAMBERS

(75) Inventors: Toru Miyasaka, Hitachi (JP); Kazushige Oonishi, Hitachi (JP); Masahiko Saito, Kitaibaraki (JP); Tadashi Okano, Hitachi (JP); Shoji Takeya, Ibaraki (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/355,003

(22) Filed: Jan. 31, 2003

(65) Prior Publication Data

US 2003/0113140 A1 Jun. 19, 2003

Related U.S. Application Data

(63) Continuation of application No. 09/987,332, filed on Nov. 14, 2001, now Pat. No. 6,526,171, which is a continuation of application No. 09/660,544, filed on Sep. 12, 2000, now Pat. No. 6,321,058, which is a continuation of application No. 09/297,520, filed as application No. PCT/JP96/03286 on Nov. 8, 1996, now Pat. No. 6,144,829.

(51) Int. Cl.[7] .......................... G03G 15/08; F03G 15/01
(52) U.S. Cl. ........................ 399/281; 399/283; 399/223
(58) Field of Search ................................ 399/279, 281, 399/283, 284, 223, 228, 236, 297, 162; 347/115

(56) References Cited

U.S. PATENT DOCUMENTS

| | | | | |
|---|---|---|---|---|
| 4,656,965 A | | 4/1987 | Hosoya et al. | |
| 4,806,992 A | * | 2/1989 | Yasuda et al. | 399/281 |
| 4,901,110 A | | 2/1990 | Tompkins et al. | |
| 5,548,386 A | | 8/1996 | Fukuda | |
| 5,701,563 A | | 12/1997 | Fukida et al. | |
| 5,722,021 A | | 2/1998 | Iwao | |
| 5,815,775 A | | 9/1998 | Miyasaka et al. | |
| 6,081,683 A | | 6/2000 | Miyasaka et al. | |
| 6,144,829 A | | 11/2000 | Miyasaka et al. | |
| 6,321,058 B1 | * | 11/2001 | Miyasaka et al. | 399/281 |
| 6,516,171 B2 | * | 2/2003 | Miyasaka et al. | 399/223 |

FOREIGN PATENT DOCUMENTS

| | | |
|---|---|---|
| JP | 61170766 A | 8/1986 |
| JP | 61179472 A | 8/1986 |
| JP | 2-7664 U | 11/1988 |
| JP | 4-40246 U | 4/1992 |
| JP | 4-85455 U | 7/1992 |
| JP | 04215676 A | 8/1992 |
| JP | 5-107922 A | 4/1993 |
| JP | 5-158345 | 6/1993 |
| JP | 6-95484 A | 4/1994 |
| JP | 7-72732 A | 3/1995 |
| JP | 07114242 A | 5/1995 |
| JP | 6-33486 U | 9/1995 |
| JP | 7-53080 U | 10/1995 |
| JP | 8-36302 | 2/1996 |
| JP | 8-314277 | 11/1996 |
| JP | 8-314277 A | 11/1996 |

* cited by examiner

*Primary Examiner*—Joan Pendegrass
(74) *Attorney, Agent, or Firm*—Antonelli, Terry, Stout & Kraus, LLP

(57) ABSTRACT

A color electrophotographic apparatus includes a photosensitive member, an exposing device for forming an image on the photosensitive member, developing devices for different colors, and a transfer member. The developing devices include a toner storing chamber, a toner carrying member for forming a toner layer, a regulating member for regulating an amount of toner attached to the toner carrying member, a toner supply chamber having a supply member therein, a toner recovery chamber having an rotating member therein, and a separating member for separating the toner supply chamber from the toner recovery chamber so that the toner supply chamber is disposable above the toner recovery chamber.

23 Claims, 4 Drawing Sheets

COLOR ELECTROGRAPHIC APPARATUS WITH DEVELOPING DEVICE HAVING SEPARATED TONER SUPPLY AND RECOVERY CHAMBERS

CROSS REFERENCE TO RELATED APPLICATION

This is a continuation of U.S. application Ser. No. 09/987,332, filed Nov. 14, 2001, now U.S. Pat. No. 6,526,171, which is a continuation of U.S. application Ser. No. 09/660,544, filed Sep. 12, 2000, now U.S. Pat. No. 6,321,058, which is a continuation of U.S. application Ser. No. 09/297,520, filed May 3, 1999, now U.S. Pat. No. 6,144,829, which is a 371 of PCT/JP96/03286 filed Nov. 8, 1996, the subject matter of which is incorporated by reference herein.

BACKGROUND OF THE INVENTION

The present invention relates to a developing device for use in an electrophotographic apparatus which is applicable for use with printers, facsimile apparatuses, copying machines, and the like.

The configuration of a known developing device is shown in FIG. 6. Referring to FIG. 6, reference numeral 1 denotes a developing roll for forming a thin layer of electrically charged toner thereon and transporting the toner to a photosensitive member; 2 denotes a transport roll for transporting the toner to the developing roll 1; 3 denotes a toner transporting vane for agitating the toner and transporting the toner to the transport roll; 5 denotes a regulating blade for regulating the amount of the toner attaching onto the developing roll 1; 6 denotes a toner storage for storing toner; 9 denotes toner; and 10 denotes a photosensitive member 10.

In a conventional developing device of the one-component type, the photosensitive member 10 is generally disposed so that at the toner transfer position, it moves downward, and the developing roll 1, with a toner thin layer formed thereon, is also arranged to rotate downward at the toner transfer position facing the photosensitive member 10 to perform development.

The toner 9 within the toner storage 6 is transported to the transport roll 2 by the rotating toner transporting vane 3. As the transport roll 2, a conductive or semiconductive foam roll is generally used. The toner 9 transported to the transport roll 2 is further transported to the developing roll 1 by the rotating transport roll 2. The amount of toner is regulated by the regulating blade 5 provided on the developing roll 1 and the toner is electrically charged by friction with the regulating blade 5 to form a thin layer of charged toner on the developing roll 1. The developing roll 1 with the charged toner thin layer formed thereon, when brought into contact with or into the vicinity of the photosensitive member 10, develops an electrostatic latent image on the photosensitive member 10.

In the configuration of the developing device of FIG. 6, because the developing roll 1 is located below the regulating blade 5, toner can be supplied in a stabilized manner to the regulating position of the regulating blade 5 located on the surface of the developing roll 1. Further, since the toner which has become a surplus by the action of the regulating blade 5 can escape into the space above the regulating blade, a flow of toner shown by an arrow 28 in the drawing is produced, and, thereby, the surplus toner is returned, in a stabilized manner, to the transport roll 2 and the toner storage 6 so as to be circulated. Thus, a stabilized toner supply to the regulating blade 5 and the recovery of the surplus toner can both be achieved, so that the toner is prevented from stagnating or solidifying.

On the other hand, in the case of a developing device of a nonmagnetic one-component type in which the photosensitive member 10 is positioned to move upward at the toner transfer position, it is necessary to cause the developing roll 1 with a toner thin layer formed thereon also to rotate upward to perform development at the toner transfer position facing the photosensitive member 10. Since, in this case, it is necessary to dispose the regulating blade 5 below the developing roll 1, it becomes difficult to supply the toner to the regulating position of the regulating blade 5 on the surface of the developing roll 1 in a stabilized manner. Further, since the surplus toner provided by the regulating blade 5 falls below the developing roll 1 due to gravity, it becomes difficult to form a circulating path as shown by the arrow 28 in FIG. 6 within the developing device.

A developing device for performing development using a developing roll 1 with a toner thin layer formed thereon, which is rotated upward at the toner transfer position facing the photosensitive member 10, is disclosed in the Japanese Patent Laid-open No. Hei 5-158345. The configuration of this developing device is shown in FIG. 7. Reference numerals used in FIG. 7 correspond to those in FIG. 6.

Referring to FIG. 7, there are formed a passage 29 for transporting toner to the side of the developing roll 1 and a passage 30 for transporting the remaining toner after the regulation by the blade has been made back to the toner storage 6 so that the toner 9 may be circulated. Further, there is disposed a transport roll 2 for assisting in the toner supply to the regulating blade 5.

In addition to the above developing device, there is disclosed in the Japanese Patent Laid-open No. Hei 5-158331 a developing device in which the developing roll 1 performs development while rotating upward at the toner transfer position facing the photosensitive member 10 and the regulating blade 5 is located above the developing roll 1. By such a configuration, it is intended to decrease the chances for the toner to be repeatedly subjected to regulation by the regulating blade and to supply toner of good quality for development to obtain a high quality image.

However, in the developing device disclosed in Japanese Patent Laid-open Publication No. Hei 5-158345, since the opening of the supply passage on the side of the developing roll is connected with the opening on the side of the return, recovery passage, namely, since the space on the side of the supply passage and the space on the side of the recovery passage are not completely separated from each other, it is difficult to simultaneously achieve a stabilized supply of the toner to the vicinity of the regulating blade and a recovery of the surplus toner regulated by the regulating blade. Therefore, in order to supply the toner to the regulating blade 5 in a stabilized manner in the developing device disclosed in Japanese Patent Laid-open No. Hei 5-158345, it is required to maintain a stabilized toner layer in contact with the surface of the transport roll under a certain amount of force and a space for allowing the toner subjected to the regulation to flow out through it in a stabilized manner.

On the other hand, with the developing device disclosed in Japanese Patent Laid-open No. Hei 5-158331, since the passage for supplying the toner to the regulating blade and that for recovering the toner are required to be arranged above the developing roll, there is a disadvantage in that the overall developing device becomes greater in thickness and, therefore, larger in overall size.

In the developing device disclosed in the Japanese Patent Laid-Open No. Hei 5-158331, in which development is performed by rotating the developing roll with a toner thin layer formed thereon upward at the toner transfer position facing the photosensitive member to develop the surface of the photosensitive member, while it is moving upward, it is required that the regulating blade be disposed at the side of or below the developing roll. However, when the regulating blade is disposed below the developing roll, it becomes difficult to supply the toner to the regulating position of the regulating blade on the surface of the developing roll in a stabilized manner.

In order to stably supply the toner to the vicinity of the regulating blade, it is required to fill up the area in the vicinity of the regulating blade with toner. However, in a state in which the area in the vicinity of the regulating blade is filled up with toner, it becomes difficult to allow the surplus toner subjected to the regulation by the regulating blade to escape and, hence, the toner tends to produce cake of toner. When, conversely, it is arranged to make it easier for the toner subjected to the regulation by the regulating blade to escape, then, since the regulating blade is located below the developing roll, it becomes difficult to stably supply the toner to the area in the vicinity of the regulating blade and, hence, it becomes difficult for the regulating blade to form a stabilized toner thin layer.

For these reasons, it is the present state of the art that the one-component developing type, in spite of its being smaller and simpler in structure than the two-component developing device, is only applied to a limited range of photographic printer configurations in which the photosensitive member rotates downward at the toner transfer point. If a one-component developing device capable of achieving stabilized development also when applied to photographic print systems having a photosensitive member rotating upward at the toner transfer point can be realized, restrictions on the overall configuration of the device will be reduced and, hence, it will become possible to provide a smaller and more stabilized electrophotographic apparatus.

SUMMARY OF THE INVENTION

It is an object of the present invention to solve the above enumerated problems and provide a one-component developing device which is capable of forming a stabilized toner layer and in which a developing roll with a toner thin layer formed thereon is rotated upward at the toner transfer position facing the photosensitive member.

It is another object of the present invention to provide a smaller and more stabilized electrophotographic apparatus by eliminating restrictions on the configuration of a one-component development system so as to allow the apparatus to be made smaller in size.

In order to attain the above objects, the invention employs a toner supply chamber for supplying toner to a developing roll and a toner recovery chamber for recovering a surplus of toner regulated by a regulating blade and, further, the toner supply chamber and the toner recovery chamber are completely separated from each other by a sheet-shaped member in contact with the developing roll. Further, the toner supplied to the supply chamber is pressed against the surface of the developing roll by the sheet-shaped member separating the toner supply chamber and the toner recovery chamber. Thereby, a relatively thick toner layer is formed on the surface of the developing roll before a toner thin layer is formed on the roll by the regulating blade. The relatively thick toner layer formed on the surface of the developing roll by the sheet-shaped member separating the toner supply chamber and the toner recovery chamber is regulated to form a toner thin layer by the regulating blade provided in the toner recovery chamber. A surplus of toner produced after the regulation is recovered via the recovery chamber.

Further, according to the present invention, since there are provided a toner supply chamber for supplying toner to the developing roll and a toner recovery chamber for recovering a surplus of toner regulated by the regulating blade, and since the toner supply chamber and the toner recovery chamber are completely separated from each other by a sheet-shaped member in contact with the developing roll, it becomes possible to increase the toner packing condition in the toner supply chamber and to decrease the toner packing density in the toner recovery chamber. Thereby, both a stabilized toner supply to the developing roll and void formation in the toner in the recovery passage can be secured.

Further, since in the above configuration a relatively thick toner layer is formed on the surface of the developing roll before the toner layer is regulated by the regulating blade, a stabilized toner supply to the regulating blade can be secured even in a configuration having the regulating blade below the developing roll.

Further, since the regulation of the toner layer by the regulating blade is carried out in the toner recovery chamber where the toner packing density is lower, a surplus of toner after the regulation can be stably recovered.

Further, the invention calls for a supply roller to be provided in the toner supply chamber so that toner is supplied in a more stabilized manner to the developing roll, while securing a high toner packing density on the side of the toner supply chamber. Further, the invention employs a raking out means provided also on the side of the toner recovery chamber for raking out toner in the recovery chamber, thereby securing space for toner in the recovery chamber.

For the aforesaid reasons, in a one-component developing device for achieving development by rotating a developing roll with a toner thin layer formed thereon upward at the toner transfer position facing the photosensitive member, a developing device capable of forming a stabilized toner layer can be provided. In addition, by employing this developing device, restrictions on the arrangement of a one-component development apparatus which tends to limit the extent to which it can be made smaller in size are eliminated, and, thereby, a smaller and more stabilized electrophotographic apparatus can be provided.

BEST MODE FOR CARRYING OUT THE INVENTION

[Embodiment 1]

An embodiment according to the present invention will be described below with reference to the accompanying drawings.

Figure 1:
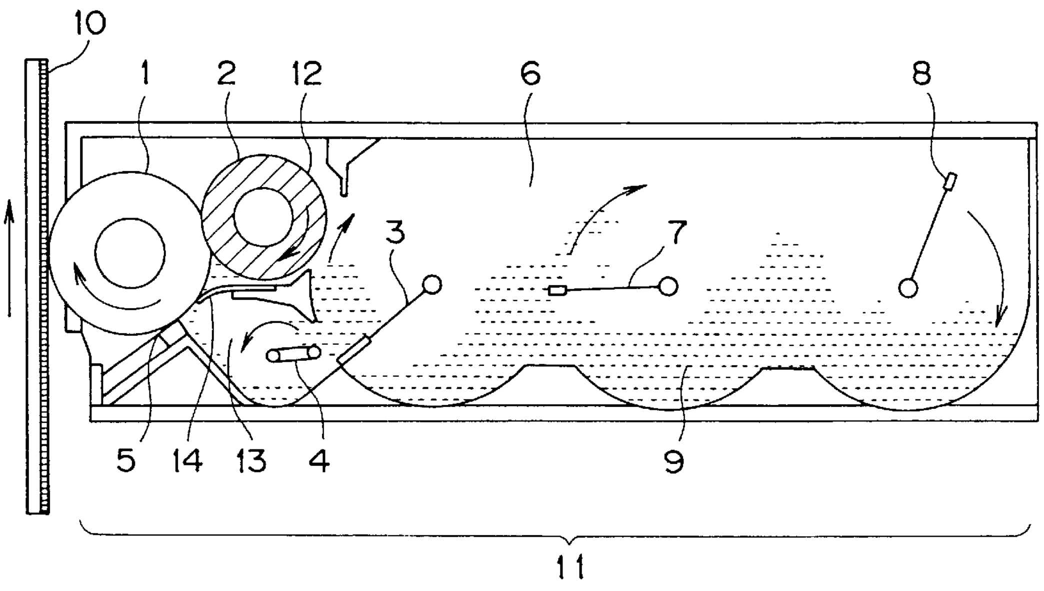
FIG. 1 is a diagram illustrating the configuration of a nonmagnetic one-component developing device representing an embodiment of the present invention.

FIG. 1 is a drawing illustrating the configuration of a nonmagnetic one-component developing device representing an embodiment of the invention. Operations of the developing device shown in FIG. 1 will be described below.

Reference numeral 1 denotes a developing roll for forming an electrically charged toner thin layer and for transporting the toner to a photosensitive member; 2 denotes a transport roll for transporting the toner to the developing roll 1; 3, 7, and 8 denote toner transporting vanes for agitating the toner and successively transporting the toner to the transport roll; 4 denotes a rotating agitator member for agitating recovered toner; 5 denotes a regulating blade for regulating the amount of the toner to be attached onto the developing roll 1; 6 denotes a toner storage for storing the toner; 9 denotes the toner; 10 denotes a photosensitive member; 12 denotes a toner supply chamber for supplying the toner 9; 13 denotes a toner recovery chamber for recovering the toner 9; and 14 denotes a sheet-shaped member disposed in contact with the lower portion of the developing roll 1.

Referring to FIG. 1, the toner 9 used for development is stored in the toner storage 6. In order to make the apparatus thin, in the present embodiment, there are disposed three toner transporting vanes 3, 7, and 8 within the toner storage 6, so that the toner is transported by rotation of the vanes in succession to one side of the developing roll. In order that toner in an amount more than necessary will not unevenly collect on the forward side of the toner storage 6, it is preferred that the toner transporting vane 8 on the rearward side of the toner storage 6 be made smaller in toner transporting power than the toner transporting vane 3 on the most forward side. In this embodiment, the rotating speeds of the vanes 7 and 8 are set to be progressively slower than that of the toner transporting vane 3 on the most forward side according to the position of the vanes in the rearward direction. Further, the vane areas are made progressively smaller according as the vanes are positioned more rearwardly of the toner transporting vane 3 on the most forward side. The toner 9 within the toner storage 6 is transported to the developing roll by rotation of these vanes.

Above the peripheral face of the developing roll, there is formed the toner supply chamber 12. The toner 9 transported to the most forward portion of the toner storage 6 is transported to the toner supply chamber 12 by the toner transporting vane 3. Within the toner supply chamber 12, there is disposed the supply roll 2 formed of a conductive and elastic foam roll, which supplies the toner 9 in the toner supply chamber 12 to one side of the developing roll 1 and presses the toner against the same. In order that the supply of toner to the developing roll 1 is achieved in a more stabilized manner, it is preferred that the supply roll 2 be disposed to contact the developing roll 1 and be pressed against the same by an amount of several hundred microns to several millimeters.

The toner 9 supplied to the supply chamber 12 is pressed against the side of the developing roll 1 by rotation of the supply roll 2 and, while being pressed against the developing roll 1 by the sheet-shaped member 14 disposed below the developing roll in the supply chamber, it leaks out to the side of the toner recovery chamber 13. Since the toner 9 is electrically charged to a certain degree at this time due to friction with the developing roll 1, the sheet member 14, the supply roll 2, and so forth, it attaches to the surface of the developing roll 1, which is made of a conductive material, to form a toner layer on the surface of the developing roll 1.

The toner layer thus formed on the developing roll is regulated by the regulating blade 5 disposed in the toner recovery chamber 13 to a toner layer thickness and a toner electric charge amount suitable for development.

While the ultimate amount of the electric charge and that of the attached toner of the toner thin layer necessary for development depend on the conditions of the development to be performed, the apparatus, and the toner used, it is generally within the range of 0.1–1.5 mg/cm2 for the attached amount and of 5–40 $\mu$C/g for the charged amount. The attached amount of the toner to be attached to the surface of the developing roll before it goes past the regulating blade must be made sufficiently greater than the ultimate target of the attached amount by means of the sheet-shaped member 14 separating the toner supply chamber 12 and the toner recovery chamber 13 from each other. As to the electric charge amount, it should be made smaller than the ultimate target charge amount. In order that a large amount of the toner is attached onto the developing roll 1 with a relatively small amount of electric charge, it is arranged such that the sheet-shaped member 14 separating the toner supply chamber 12 from the toner recovery chamber 13 is held in contact with the developing roll 1 under a lower pressure than that acting on the regulating blade 5 disposed on the downstream side of the developing roll, with the flat face portion (the abdominal portion) of the sheet-shaped member 14 in contact with the developing roll 1.

When the pressure acting on the sheet-shaped member 14 is greater than necessary, the toner layer formed thereby becomes thinner so that a suitable toner layer becomes unable to be formed by the regulating blade 5. The suitable value of the contact pressure between the sheet-shaped member 14 and the developing roll 1, though it depends on the supplying ability of the supply roll 2, the fluidity of the used toner material, and the ultimate target toner amount, generally is around 0.1–50 g/cm in line pressure. In the developing device of this embodiment, when the ultimate toner charge amount formed on the developing roll is set at 10–20 $\mu$C/g and the ultimate attached amount is set at 0.4–0.8 mg/cm$^2$, a line pressure of about 30–80 g/cm$^2$ is applied to the regulating blade, while a contact line pressure of about 1–10 g/cm$^2$ is applied to the sheet-shaped member 14. Then, a charge amount of 1–5 $\mu$C/g and a toner layer with an attached amount of 0.6–1.5 mg/cm$^2$ could be obtained before reaching the regulating blade.

In such a structure that the angled portion (edge portion), not the flat face portion, of the sheet hits the roll, the toner layer formed thereby was liable to become uneven and the toner layer finally formed by the regulating blade 5 was liable to become deficient in uniformity. In order to form a stabilized, uniform toner layer, it is preferred that the sheet-shaped member 14 be put into contact with the developing roll 1 at its flat plane portion.

The toner 9 left over by the regulation of the regulating blade 5 flows down onto the side of the toner recovery chamber 13 provided below the toner supply chamber. In the toner recovery chamber 13, there is provided the rotating agitator member 4, which agitates the recovered toner in the recovery passage to prevent the toner from stagnating or solidifying and also rakes it to be transported to the side of the toner storage 6. Thereby, there is always left a void in the toner recovery chamber 13 which allows the toner left over after the regulation by the regulating blade 5 to flow into the toner recovery chamber 13 in a stabilized manner.

Figure 2:
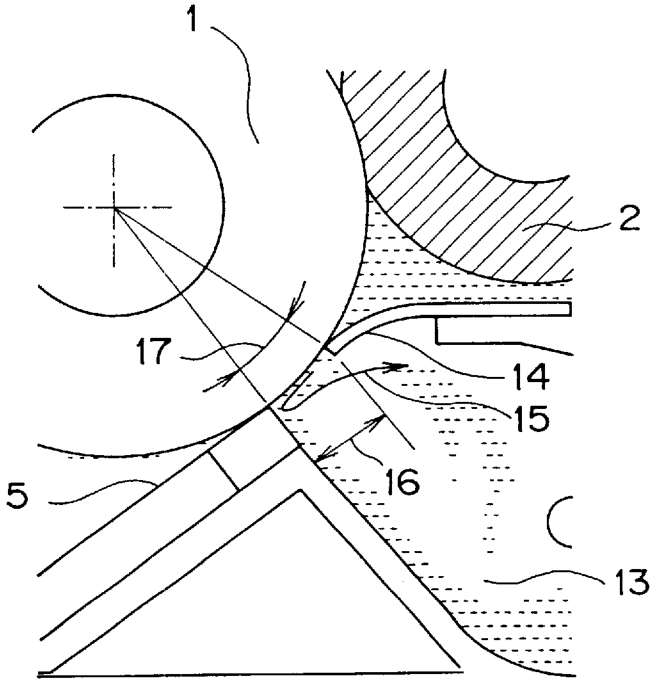
FIG. 2 is a diagram illustrating details of the vicinity of a regulating blade and a sheet-shaped member in the embodiment of FIG. 1.

FIG. 2 is a drawing showing details of the vicinity of the developing roll 1 and the front end of the regulating blade 5 and the vicinity of the contacting point of the sheet-shaped member 14. When the toner which is transported deposited on the developing roll 1 by the sheet-shaped member 14 is subjected to regulation by the regulating blade 5, the surplus toner flows in the direction of the arrow 15 in a manner sprung back. At this time, if the distance 16 between the front ends of the sheet-shaped member 14 and the regulating blade 5 is narrow, since the toner is sprung back toward the front end of the sheet-shaped member 14, such a phenomenon occurs that the toner does not fall into the toner recovery chamber 13 but gets solidified between the sheet-shaped member 14 and the regulating blade 5.

In order to prevent this, it is required to provide a suitable gap distance 16 between the sheet-shaped member 14 and the regulating blade 5. In the configuration of the embodiment, a gap distance of about 1 mm or above was empirically necessary though it depends on the fluidity of the toner, the speed of processing, and the like. When there is a variation in the angle 17 between the contacting points of the regulating blade 5 and the sheet-shaped member 14 with the surface of the developing roll 1, the direction in which the toner is sprung back by the regulating blade 5 deviates from the direction in which the sheet-shaped member 14 is oriented. It is necessary to set the angle 17 between the contacting points of the regulating blade 5 and the sheet-shaped member 15 with the developing roll 1 at 2–3 degrees or above.

Figure 3:
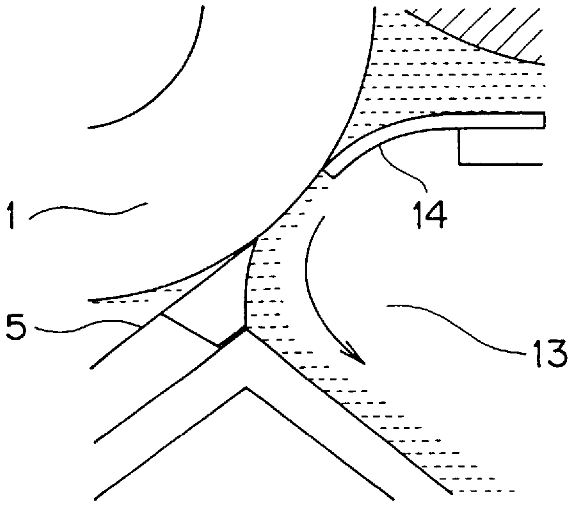
FIG. 3 is a diagram showing another configuration of the regulating blade.

As another method to prevent occurrence of the above phenomenon, such a method can be thought of to form the front end portion of the regulating blade 5 into an acute angled-shape as shown in FIG. 3 or a streamline shape. In order to apply this method, the shape must be carefully examined because the strength of the front end portion of the regulating blade 5 and the fluidity of the toner affect the press of the blade. Basically, it is necessary to make the gap 16 between the sheet-shaped member 14 and the regulating blade 5 and the angle 17 between the contacting points larger.

Figure 4:
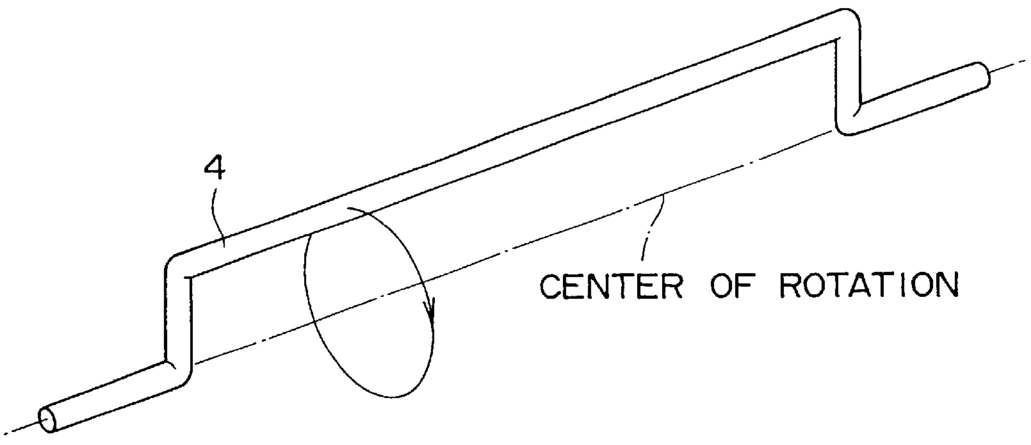
FIG. 4 is a perspective view of a rotating agitator member of the present invention for use in the embodiment of FIG. 1.

FIG. 4 shows a perspective view of the rotating agitator member 4 of the invention in the embodiment of FIG. 1.

The rotating agitator member 4 is of such a configuration that has no shaft in the center of rotation of the agitating portion as shown in FIG. 4. If the rotating agitator member 4 is provided with the rotation center, the toner attaches to and deposits around the rotation center shaft and such a defect is caused that the toner develops into a toner shaft with the same diameter as the outer diameter of the vane. If such a state is brought about, it becomes unable to obtain the agitating function that is the originally expected function of the rotating agitator member 4. Therefore, the rotating agitator member 4 in the present invention is arranged to have no center shaft as shown in FIG. 4. It is preferred that the sectional form of the rotating vane portion be suitably designed according to the fluidity of the toner, and the like. The toner in the recovery passage is progressively raked back to the toner storage 6 by the rotation of the rotating agitator member.

The toner transporting vane 3 in the toner storage 6 for transporting the toner in the toner storage 6 to the side of the toner supply chamber 12 also operates to transport and push the toner into the position of the outlet of the toner recovery chamber 13. In the developing device of the invention, it is adapted such that the rotating agitator member 4 rakes out the toner by its rotation to the toner storage 6 at the timing adjusted to the vane 3 pushing the toner into the toner recovery chamber. Therefore, the transportation of the toner into the recovery chamber 13 by the rotation of the toner transporting vane 3 in the toner storage 6 is suppressed and the toner 9 is prevented from flowing backward into the toner recovery chamber 13.

In the developing device of the invention of FIG. 1, it is arranged such that the ratio between the rotation diameters of the toner transporting vane 3 in the toner storage 6 and the rotating agitator member 4 in the toner recovery chamber 13 is 3:1 and the ratio between their rotation periods is 1:3. By this arrangement, in the embodiment of the invention, the toner in the toner recovery chamber 13 is pushed out by the rotating agitator member 4 at the timing adjusted to the toner transporting vane 3 in the toner storage 6 transporting the toner 9 to the side of the outlet of the toner recovery chamber 13 and, before the toner transporting vane 3 pushes in the toner 9 to the side of the toner recovery chamber 13 again, the rotating agitator member 4 operates twice to transport the toner from the toner recovery chamber 13 to the toner storage 6. Thus, the toner can be transported back to the toner storage 6 more efficiently, while the toner is prevented from being put into the side of the toner recovery chamber 13 by the toner transporting vane 3.

[Embodiment 2]

Now, an embodiment of a color electrophotographic apparatus employing a developing device of the present invention will be shown.

When the nonmagnetic one-component developing device of the invention is applied, the developing device can be disposed on the plane facing the photosensitive member moving upward. Therefore, restrictions on the overall arrangement and configuration of the electrophotographic apparatus are reduced and a more effective configuration of the apparatus can be realized. Originally, the nonmagnetic one-component developing device is simpler in structure and can be advantageously made smaller than the two-component developing device.

Figure 5:
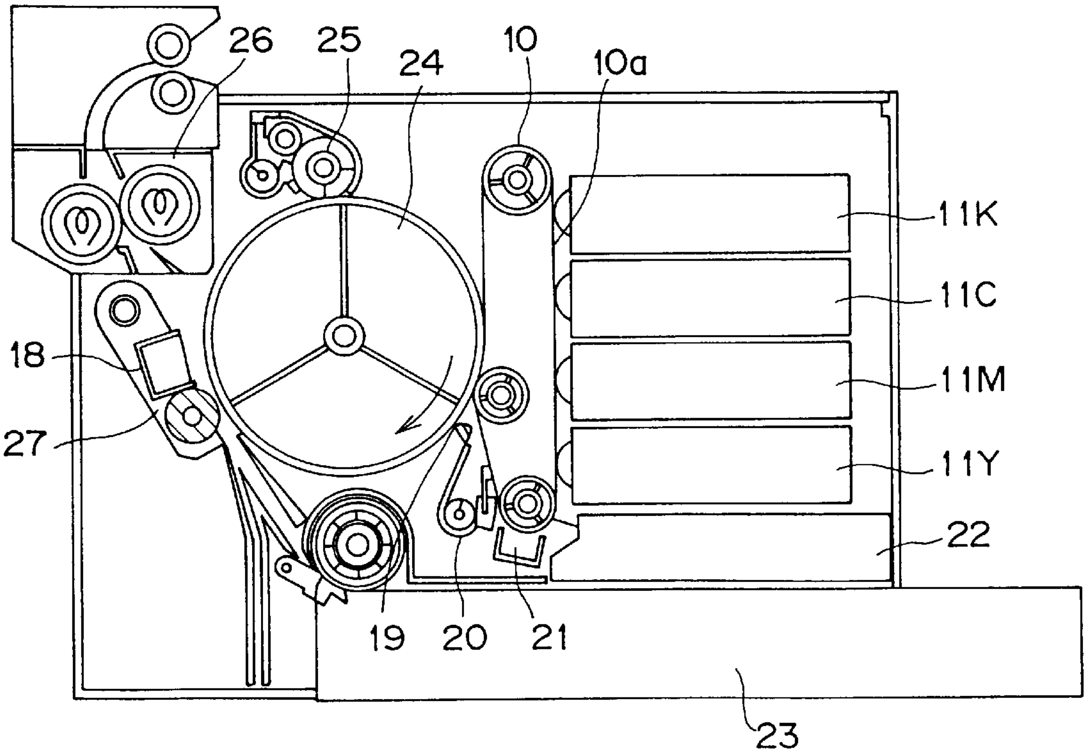
FIG. 5 is a diagram showing an example of a small color electrophotographic apparatus employing the developing device of the present invention.
Figure 6:
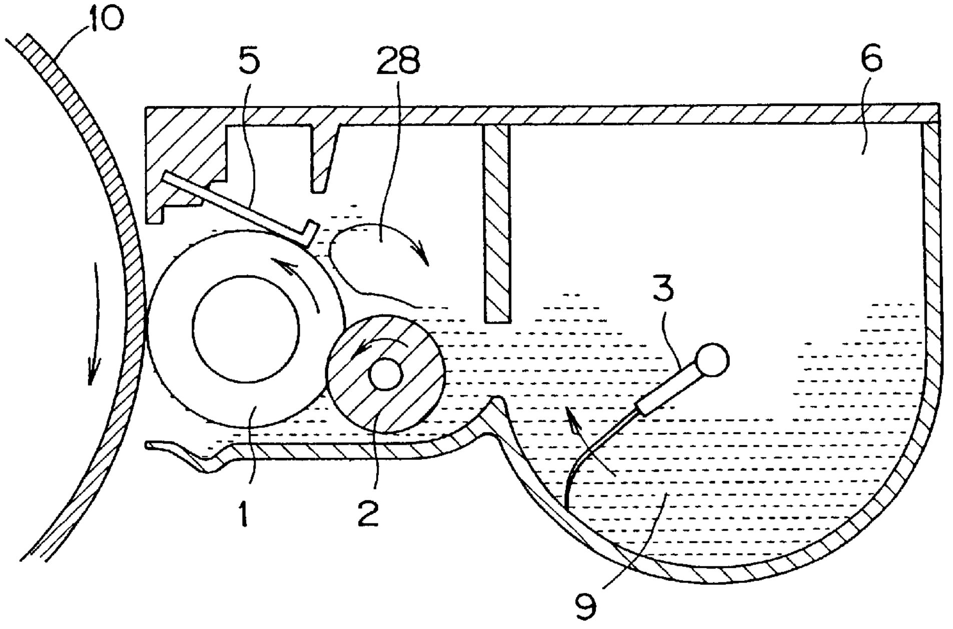
F I G. 6 (PRIOR ART)
FIG. 6 is a diagram showing the configuration of a known nonmagnetic one-component development apparatus.
Figure 7:
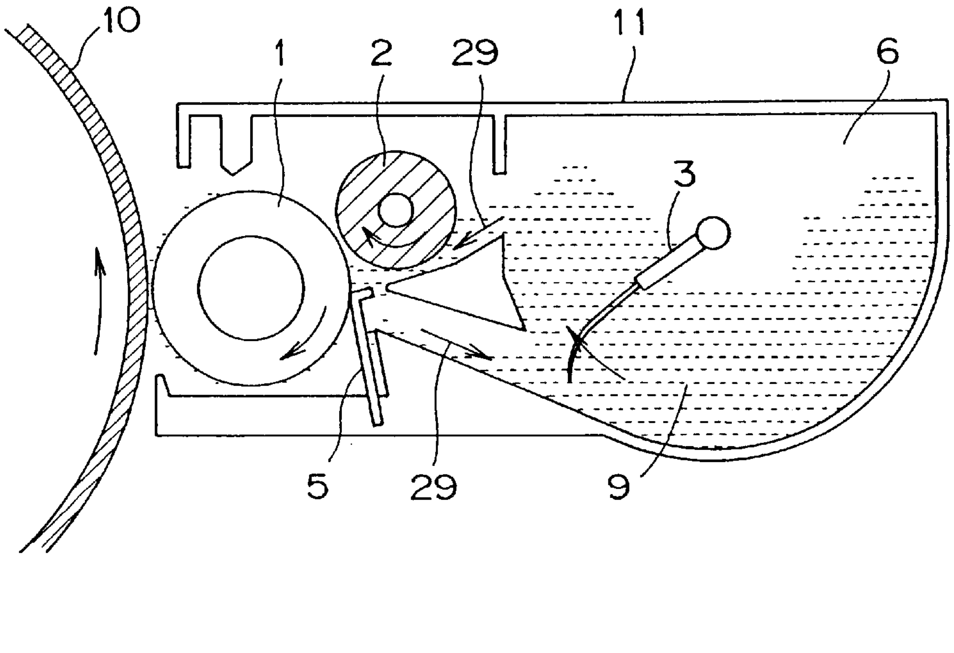
F I G. 7 (PRIOR ART)
FIG. 7 is a diagram showing another configuration of known nonmagnetic one-component development apparatus.

FIG. 5 shows an embodiment of a configuration of a small color electrophotographic apparatus employing a developing device of the invention. Shown in FIG. 5 is a color electrophotographic apparatus of a type employing a photosensitive belt and an intermediate transfer drum 24.

Referring to FIG. 5, reference numeral 10*a* denotes a photosensitive belt, 11Y, 11M, 11C, and 11K respectively denote developing devices for transferring yellow image, magenta image, cyan image, and black image; 18 denotes a charge eliminator for de-charging a sheet of paper onto which an image has been transferred and peeling it off the intermediate transfer drum; 19 denotes an erase lamp for erasing electric charge remaining on the surface of the photosensitive belt; 20 denotes a blade cleaner for removing residual toner on the surface of the photosensitive belt 10*a*; 21 denotes a charger for uniformly charging the surface of the photosensitive belt; 22 denotes a laser exposing device for exposing the surface of the photosensitive belt 10*a* which is uniformly charged and forming an electrostatic latent image on the surface thereof; 23 denotes a paper cassette for containing sheets of paper; 24 denotes the intermediate transfer drum for completing a plurality of toner images formed on the photosensitive belt 10*a* and transferring the color toner image onto a sheet of paper; 25 denotes a cleaner for removing residual toner on the intermediate transfer drum 24, and 26 denotes a fixing device for allowing the sheet of paper onto which a toner image has been transferred to pass between a heating roller and a pressure roller so that the toner image is fixed on the sheet of paper.

A photographic printing process performed in the apparatus of FIG. 5 will be briefly described below. After the photosensitive member 10 is uniformly charged by the charger 21, exposure in accordance with an image signal is made by the laser exposing device 22 so that an electrostatic latent image is formed on the photosensitive member 10. The electrostatic latent image formed on the photosensitive belt 10*a* is developed by the developing device 11Y of the invention containing yellow toner. The image gone through the development is electrostatically transferred onto the intermediate transfer drum 24. The photosensitive member 10, after the transfer has been made, is irradiated by the erase lamp 19 to have the electrostatic image erased therefrom and, then, cleaned of residual toner by the blade cleaner 20. The photosensitive belt 10*a* gone through the cleaning is subjected to charging and exposure again so that an electrostatic latent image is formed on the photosensitive belt 10*aa* again. The electrostatic latent image on the photosensitive belt 10*a* is developed by the developing device 11M of the invention containing magenta toner so that a magenta image is formed on the photosensitive member. The developing devices used for development are switched by being detached from the photosensitive member 10. The magenta image on the photosensitive member is transferred onto the intermediate transfer member 24 superposed on the yellow image. In succession thereto, through the similar process, a cyan and a black image are formed and superposed one after the other on the image on the intermediate transfer drum 24. The four color images superposed one over another on the intermediate transfer drum 24 are simultaneously, electrostatically transferred in a lump 27 onto a sheet of paper transported from the paper cassette 23, whereby a four-color image is formed on the sheet of paper. The intermediate transfer drum 24 from which the image has been transferred to the sheet of paper is cleaned of the residual toner by the cleaner 25. The sheet of paper with the image transferred onto the same is de-electrified by the deelectrifier 18 and peeled off the intermediate transfer drum 24 and then the image is heated to melt and fixed by the fixing device 26 and thereby a final image is obtained.

The configuration of the apparatus shown in this embodiment, by employing the photosensitive belt 10*a* and disposing the developing devices in tiers on one side thereof, realizes highly packed mounting of components with a simple structure. Further, by employing the intermediate transfer member 24, there are produced no sharply bent portions on the transport passage of a sheet of paper. Hence, recording on a thick sheet of paper is made possible and wide variety of kinds of paper are usable as with a monochromatic electrophotographic apparatus. Further, by employing the intermediate transfer drum for stabilizing the rotating operation of the intermediate transfer member, it is made possible to have images of various colors formed on the photosensitive belt finely registered with each other and to realize a full-color record of high-quality image.

The apparatus shown in this embodiment is an embodiment of a full-color electrophotographic apparatus with merits of being small in size and having highly packed components, recording high-quality image, and having taken into consideration such a convenience in use as applicability to face-down waste paper and various types of paper.

Through application of the developing device of this embodiment, it also becomes possible to realize an apparatus with the most suitable configuration.

What is claimed is:

1. A color electrophotographic apparatus comprising:
 - a photosensitive member;
 - an exposing device for forming an electrostatic latent image on said photosensitive member;
 - four developing devices which attach toner on said photosensitive member; and
 - a transfer member for transferring said toner image onto a printing medium;
 - wherein said four developing devices include a yellow image developing device, a magenta image developing device, a cyan image developing device, and a black image developing device;
 - wherein each of said four image developing devices include:
   - a toner storing chamber for storing toner of a nonmagnetic one-component developer;
   - a toner carrying member for forming a toner layer;
   - a regulating member for regulating an amount of toner attached to said toner carrying member;
   - a toner supply chamber having a supply member therein for supplying toner in said toner supply chamber;
   - a toner recovery chamber having a rotating member therein; and
   - a separating member for separating said toner supply chamber from said toner recovery chamber so that said toner supply chamber is disposable above said toner recovery chamber;
   - wherein said photosensitive member moves from a downward direction in a gravity direction to an upward direction in a position facing respective ones of said developing devices.

2. A color electrophotographic apparatus according to claim 1, wherein said supply member supplies toner to said toner carrying member, and is disposed on an opposite side of said toner carrying member with respect to said photosensitive member.

3. A color electrophotographic apparatus according to claim 1, wherein said supply member is in contact with a surface of said toner carrying member.

4. A color electrophotographic apparatus according to claim 1, wherein said supply member is formed of a conductive roll.

5. A color electrophotographic apparatus according to claim 1, wherein said supply member is formed of an elastic roll.

6. A color electrophotographic apparatus according to claim 1, wherein said supply member is formed of a foam roll.

7. A color electrophotographic apparatus according to claim 1, wherein said separating member is in contact with a surface of said toner carrying member.

8. A color electrophotographic apparatus according to claim 1, wherein said rotating member transports recovered toner regulated by said regulating member outside of said toner recovery chamber.

9. A color electrophotographic apparatus according to claim 1, wherein said rotating member agitates recovered toner regulated by said regulating member.

10. A color electrophotographic apparatus according to claim 9, wherein a contact pressure between said separating member and said toner carrying member is lower than a contact pressure between said regulating member and said toner carrying member.

11. A color electrophotographic apparatus according to claim 1, wherein said toner recovery chamber has a sloped portion which enables toner regulated by said regulating member to flow into said toner recovery chamber and to flow toward said rotating member.

12. A color electrophotographic apparatus according to claim 1, wherein said regulating member regulates toner on said toner carrying member at a lower position than said separating member.

13. A developing device comprising:

a toner storing chamber for storing toner of a nonmagnetic one-component developer;

a toner carrying member for forming a toner layer;

a regulating member for regulating an amount of toner attached to said toner carrying member;

a toner supply chamber having a supply member therein for supplying toner in said toner supply chamber;

a toner recovery chamber having an rotating member therein; and a separating member for separating said toner supply chamber from said toner recovery chamber so that said toner supply chamber is disposable above said toner recovery chamber;

wherein said toner carrying member moves from a upward direction in a gravity direction to a downward direction in a position facing said toner supply chamber and said toner recovery chamber.

14. A developing device according to claim 13, wherein said supply member is in contact with a surface of said toner carrying member.

15. A developing device according to claim 13, wherein said supply member is formed of a conductive roll.

16. A developing device according to claim 13, wherein said supply member is formed of an elastic roll.

17. A developing device according to claim 13, wherein said supply member is formed of a foam roll.

18. A developing device according to claim 13, wherein said separating member is in contact with a surface of said toner carrying member.

19. A developing device according to claim 13, wherein said rotating member transports recovered toner regulated by said regulating member outside of said toner recovery chamber.

20. A developing device according to claim 13, wherein said rotating member agitates recovered toner regulated by said regulating member.

21. A developing device according to claim 20, wherein a contact pressure between said separating member and said toner carrying member is lower than a contact pressure between said regulating member and said toner carrying member.

22. A developing device according to claim 13, wherein said toner recovery chamber has a sloped portion which enables toner regulated by said regulating member to flow into said toner recovery chamber and to flow toward said rotating member.

23. A developing device according to claim 13, wherein said regulating member regulates toner on said toner carrying member at a lower position than said separating member.

* * * * *